United States Patent Office 2,960,825
Patented Nov. 22, 1960

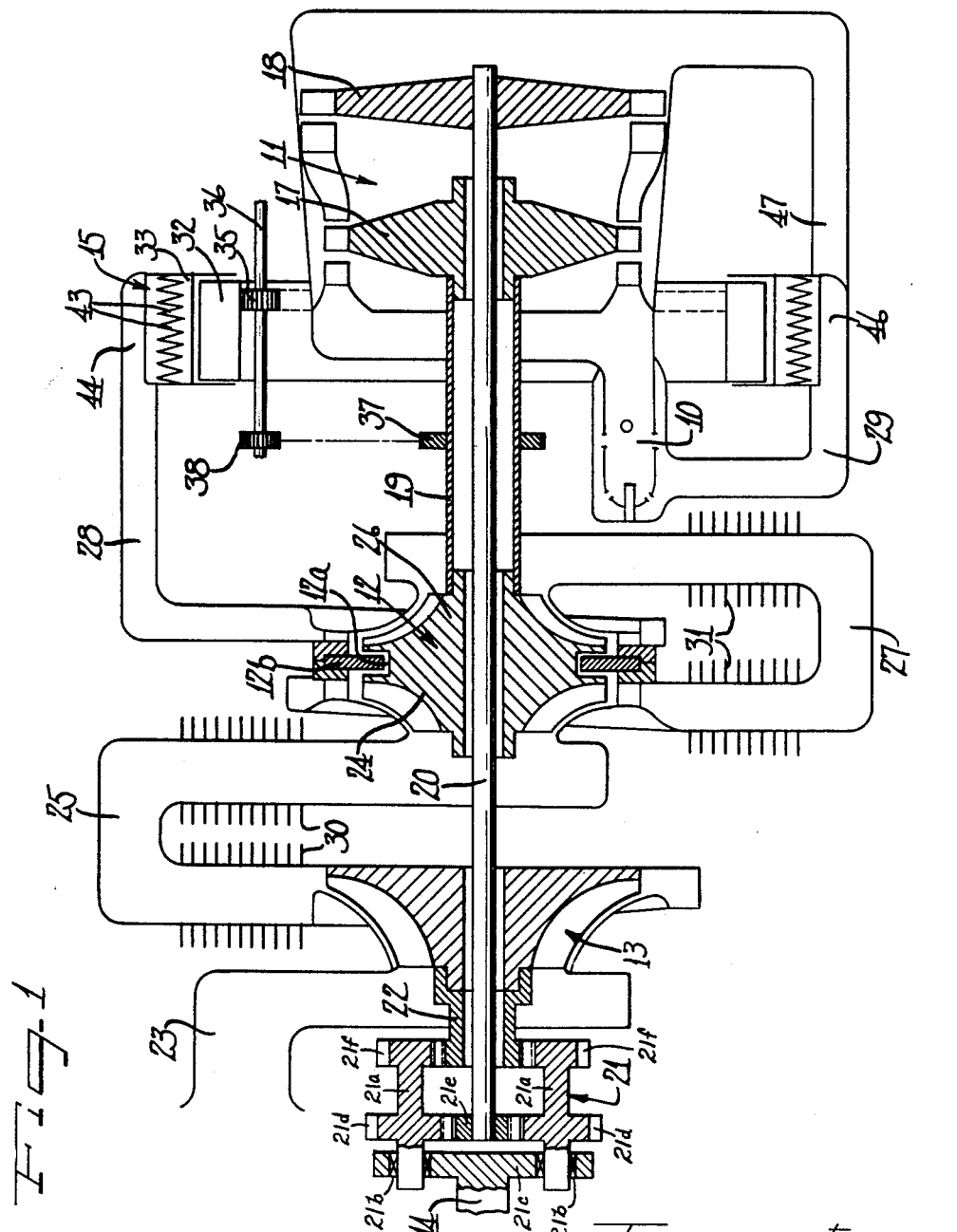

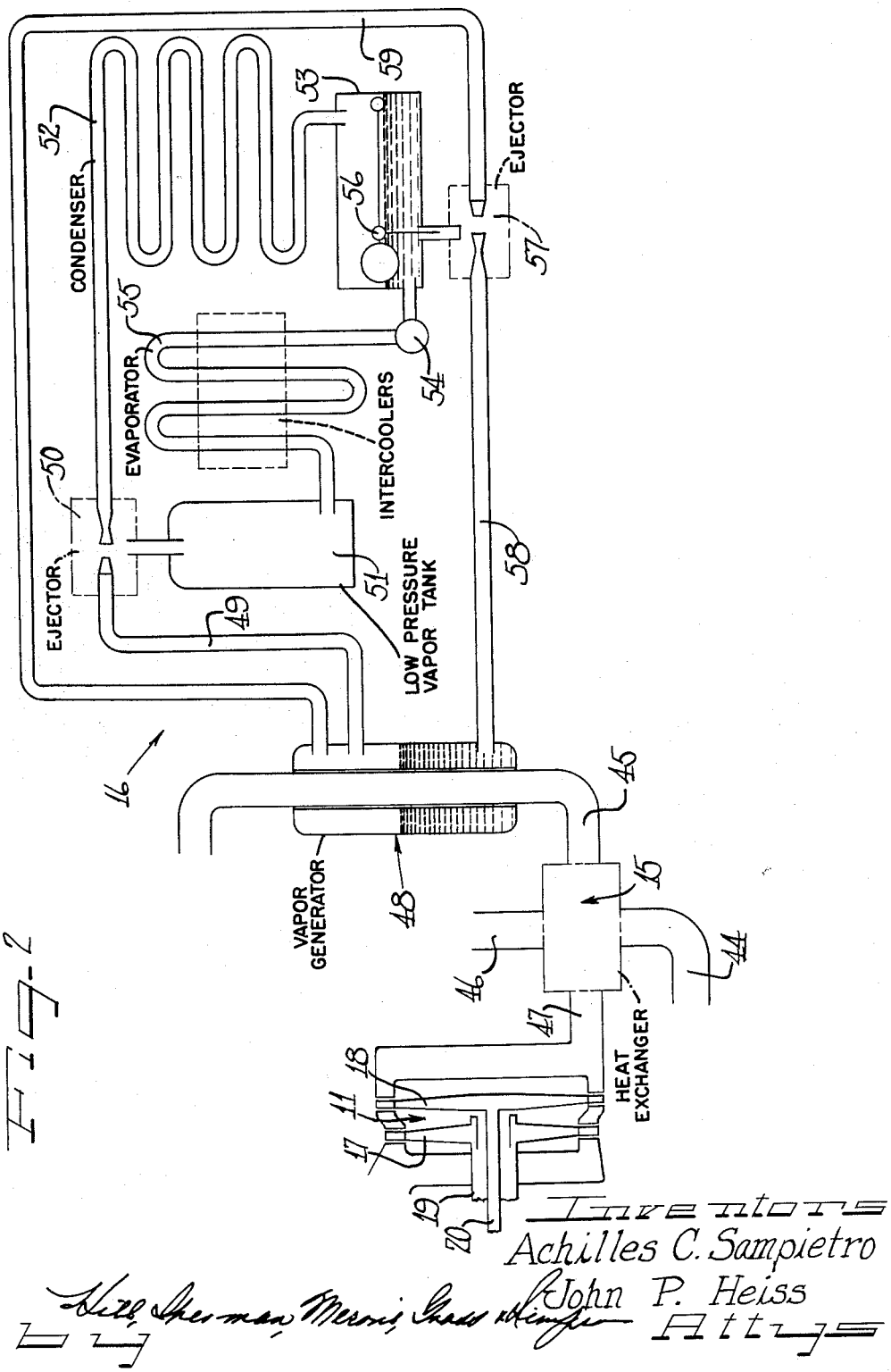

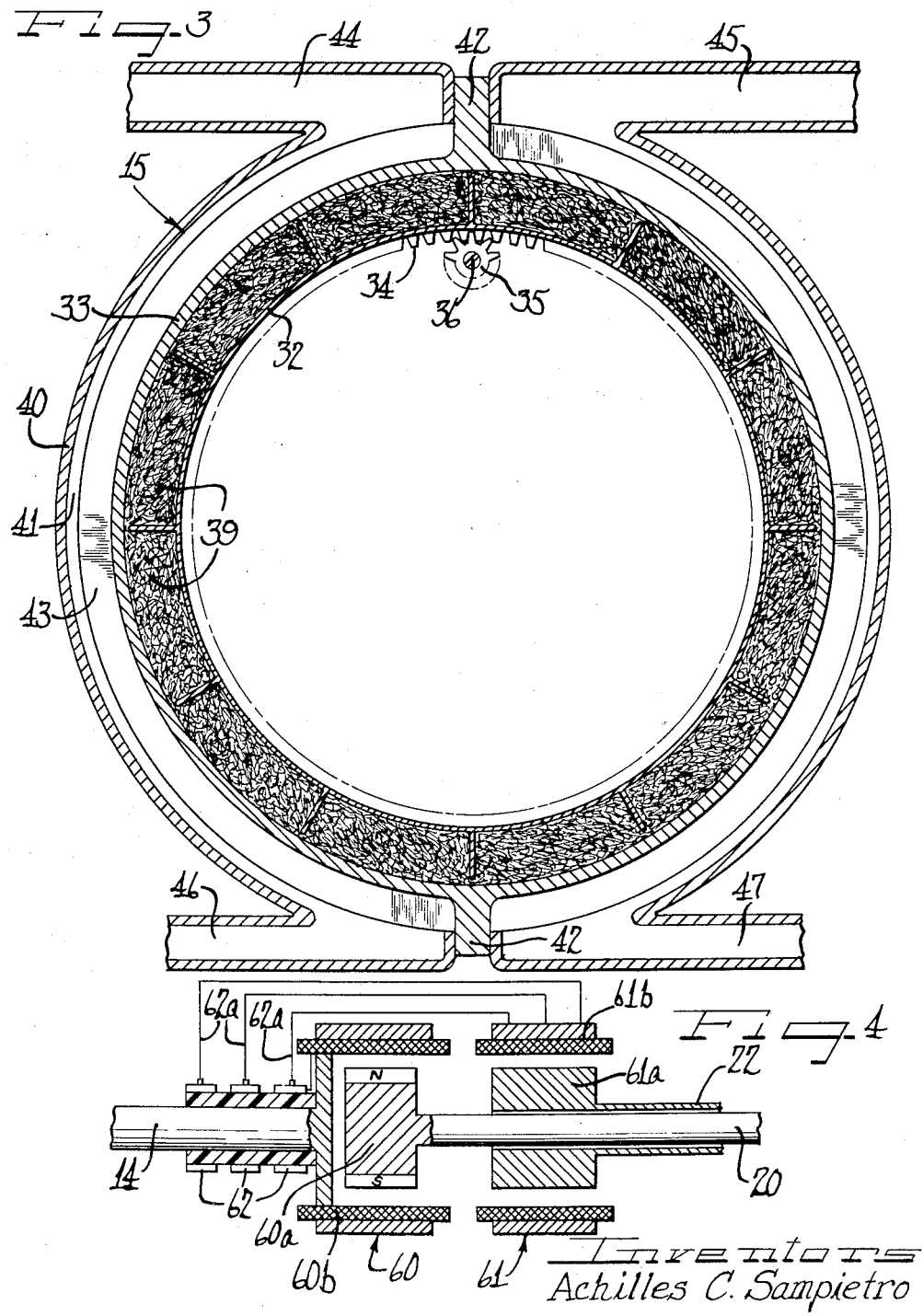

2,960,825

REEXPANSION GAS TURBINE ENGINE WITH DIFFERENTIAL COMPRESSOR DRIVE

Achilles C. Sampietro, Ann Arbor, and John P. Heiss, Flint, Mich., assignors to Thompson Ramo Wooldridge Inc., a corporation of Ohio Filed Oct. 19, 1955, Ser. No. 541,426

4 Claims. (Cl. 60—39.16)

This invention relates to a device for converting molecular energy into propulsive or mechanical power by placing a body of gas under pressure and discharging the gas through a turbine. The invention more particularly relates to a compact and efficient gas turbine engine for use in providing power wherever desired, such as in automotive use or other devices where a wide range of operating speeds and load conditions are encountered, although other uses and purposes may be apparent to one skilled in the art.

According to the invention, a compound gas turbine engine includes a primary high pressure compressor-turbine assembly performing for maximum efficiency in a relatively intermediate to high speed range and is operated at said speed continuously. A secondary or booster, low pressure compressor-turbine assembly operates at variable speed in a relatively low to intermediate speed range, and is automatically driven to deliver a variable output according to speed or load conditions. An interstage cooling system is provided which utilizes the hot turbine exhaust gases to extract heat from the air between compressor stages. And a pre-heating regenerator, also utilizing the hot turbine exhaust gases, pre-heats the air entering the combustion chamber to increase the overall efficiency of the turbine throughout its work cycle.

In the preferred embodiment of the invention, a plurality of turbine wheels are driven by products of combustion from a combustion chamber. The turbine, first to be subjected to the products of combustion, is directly connected to a multi-stage primary compressor, although a single stage primary compressor may be substituted therefor, while a second turbine wheel, driven by the exhaust gases of the first wheel, is differentially connected to a single stage, secondary compressor through the output shaft. The differential connection may comprise an epicyclic gear train or a combined electric generator-motor drive arrangement. The differentially driven compressor discharges to the directly driven compressor. The air is then taken into a heat exchanger for regeneration purposes before discharge into the combustion chamber. Heat is extracted from the air between the compressor stages by a refrigeration unit. The heat exchanger and the refrigeration unit utilize the turbine exhaust gases for operation thereof.

Thus, the air feed to the combustion chamber is proportional to the power output. And at lower speeds or load requirements a corresponding reduction is accomplished in the air intake. The differential driving connection thereby permits the secondary compressor turbine assembly to operate in variable speed range less than the constant speed of the primary compressor turbine assembly.

The relative fuel economy for the differential twin spool engine of the present invention in comparison to the free turbine engine is that, in the latter, the gasifier section absorbs a constant amount of power throughout its entire range of operation. Therefore, a constant weight of air is consumed which seriously affects the specific fuel consumption. This is not the case in the differential twin spool engine, thereby improving the specific fuel consumption for any given load requirement.

Accordingly, it is an object of this invention to provide an improved and highly efficient device for changing molecular energy into mechanical or propulsive power.

A further object of this invention is to provide a gas turbine engine adaptable for automotive use and the like and capable of efficiently operating through a wide range of operating speeds and load conditions.

Another object of this invention is to provide a gas turbine engine having intercooling means between compressor stages utilizing the hot turbine exhaust gases.

Still another object of this invention is to provide a gas turbine engine including a refrigeration system for providing intercooling between the compressor stages, wherein the refrigeration system is operated from the turbine exhaust gases.

Another feature of the invention is to provide a gas turbine engine having a regenerator discharging into the combustion chamber which comprises a heat exchanger operable from the hot turbine exhaust gases.

Another object of the invention is to provide a gas turbine engine having a plurality of turbine-compressor assemblies, wherein the speed of one of the assemblies is proportionately controlled with respect to the power output of the engine.

It is also an object of this invention to provide a gas turbine engine having a plurality of turbine wheels driven by the combustion products of a combustion chamber, a multi-stage primary compressor directly driven by one of the turbines, and a single stage secondary compressor differentially driven by another turbine wheel, wherein the single stage secondary compressor, associated turbine, and the output shaft are differentially connected to vary the speed of the single stage secondary compressor relative to the power output of the engine.

Still a further object of this invention is in the provision of a gas turbine engine having a compressor differentially connected to the output shaft and a turbine, wherein the differential connection comprises an epicyclic gear train.

Another object of this invention is to provide a gas turbine engine having a compressor differentially connected to the output shaft and a turbine, wherein the differential connection comprises an electric generator-motor arrangement.

Other objects, features, and advantages of the invention will be apparent from the following detailed description of the drawings, which illustrates the invention.

On the drawings:

Figure 1 is an axial cross sectional view of a turbine engine in accordance with the invention, and illustrating some parts in schematic view;

Figure 2 is a schematic view of the refrigeration system used for intercooling the air between the compressor stages in accordance with the invention;

Figure 3 is a cross sectional view, with some parts in elevation, of a heat exchanger in accordance with the invention; and Figure 4 is an axial sectional view, with some parts in elevation and others in schematic, of a modified differential connecting arrangement in accordance with the invention, for interconnecting the output shaft, one turbine, and one of the compressors.

As shown on the drawings:

Referring now to Figure 1, the gas turbine engine of the present invention generally includes a combustion chamber 10 fed with fuel in any suitable manner, a compound turbine unit 11 powered by the combustion products of the combustion chamber 10, a multi-stage primary centrifugal compressor 12 and a single stage secondary centrifugal compressor 13 driven by the compound turbine unit 11, an output shaft 14, a heat exchanger 15 for regeneration purposes, and intercooling means 16 (Fig. 2) for cooling the air between compressor stages.

Products of combustion leave the combustion chamber 10 to drive a first turbine wheel 17. The exhaust gases from the first turbine wheel 17 are suitably guided to a second turbine wheel 18 for driving same. The first turbine wheel 17 is connected to the multi-stage compressor 12 through a hollow shaft 19 to form a free spool compressor-turbine assembly. The turbine wheel 18 is differentially connected to the single stage compressor 13 through a turbine shaft 20, an epicyclic gear train 21, the output shaft 14, and a short stub shaft 22.

The epicyclic gear train 21 may include for example, a radially spaced pair of shafts 21a, that are rotatably journaled in suitable bearings 21b in a radially flanged support portion 21c of the output shaft 14. A first pair of planet gears 21d on the shafts 21a are in meshed engagement with a sun gear 21e on the turbine shaft 20. A second pair of planet gears 21f on the shafts 21a are in meshed engagement with the short stub shaft 22 that is connected to the single stage secondary centrifugal compressor 13.

The second pair of planet gears 21f are preferably formed with pitch diameters somewhat less than the first pair of planet gears 21d, such that the single stage secondary centrifugal compressor 13 will be driven at some speed less than the speed of the turbine wheel 18 whenever a differential driving action occurs through the epicyclic gear train 21, though it should be understood that under other design considerations and operating conditions it may be desirable to drive the secondary centrifugal compressor 13 at some speed exceeding the turbine wheel 18.

Air is received in an air inlet 23 which communicates with the first compressor stage or compressor 13. Compressed air from the first compressor 13 is delivered to a second compressor stage 24 of the multi-stage compressor 12 through suitable conduits, such as indicated diagrammatically by the numeral 25. The second stage comperssor 24 discharges to the third stage compressor 26 through suitable conduit means, such as diagrammatically illustrated by the numeral 27.

From the third stage compressor 26, the high pressure air is discharged to the heat exchanger 15 through a suitable conduit 28. Regeneration takes place in the heat exchanger 15 to preheat the air before delivering same to the combustion chamber 10 through a suitable conduit 29.

A first stage intercooler 30 is provided between the first and second compressor stages, while a second stage intercooler 31 is provided between the second and third compressor stages. Thus, heat is extracted from the air between the compressor stages to reduce the actual amount of work required to carry out compression.

It is noted that the multi-stage compressor 12 is provided with a centrifugal impeller having a back-to-back wheel with a peripheral groove 12a. The groove 12a freely receives therein a baffle 12b held by the compressor housing thus providing a leak from a high pressure compressor stage 26 to the low pressure compressor stage 24, rather than from the high and low pressure stages to atmosphere.

As seen in Figures 1 and 3, the heat exchanger 15 includes relatively rotatable members 32 and 33 in concentric mounted relationship. In this instance, the member 32 is rotatable and carries an internal gear 34 in meshing relationship with a pinion gear 35 on a supporting shaft 36.

The rotatable member 32 may be suitably driven in any manner, and in the instant case a gear 37 is mounted on the shaft 19 of turbine 17 to be drivingly connected by any suitable means to a pinion gear 38 on the driven shaft 36 of the heat exchanger.

Referring now to Figure 3 in conjunction with Figure 1, the rotatable member 32 is provided with an annular series of pockets 39 which carry a mass of material such as a mixture of carbon and metal particles. It is understood that any mixture of particles of suitable materials that would flow in a manner similar to liquid could be employed. For illustration purposes, excellent results may be obtained by a mixture of graphite powder and steel or sintered shots.

The material is compacted in and fills the pockets 39 in such a manner as to come into good frictional contact with the inner surface of the stationary ring member 33. An outer metal shroud 40 cooperates with the outer surface of the stationary member 33 to define an annular fluid chamber 41 about the stationary member 33 and concentric therewith. This annular chamber 41 is divided into two arcuate halves by diametrically opposed projections 42, 42 mounted on and integral with the stationary member 33.

The stationary ring member 33 is provided with radially projecting fin members 43 of slightly less depth than the annular chamber 41. These thin members augment the heat transfer between the air flowing therearound and the stationary ring member 33.

The projecting members 42 also separate the air inlet and outlet ducts for the annular chamber 41. The upper projection 42 separates an air inlet or passage 44 from a hot turbine exhaust gas outlet or passage 45. Similarly, the lower projection 42 separates an air outlet or passage 46 from a turbine exhaust gas inlet or passage 47.

In the course of the travel of the hot exhaust gases along the portion of the stationary ring member 33 between the gas inlet 47 and the gas outlet 45, heat is transferred to the material in the pockets 39 through the stationary ring member 33. This is occasioned by the scrubbing of the material in the pockets 39 against the heated inner surface of the ring 33. The transfer of the heat from the gases to the ring 33 is, of course, augmented by the fin members 43.

Contemporaneously, as the rotatable member 32 rotates, the heated sectionalized masses of material in the pocket 39 are brought into contact with and scrub the internal surface of the portion of the stationary ring 33 between the air inlet 44 and the air outlet 46 to transfer heat thereto. The heat transferred to this portion of the ring 33 is, in turn, transferred to the air traveling in the corresponding portion of the annular chamber 41.

Thus, a regeneration is accomplished, wherein the incoming air is preheated before entering the combustion chamber 10.

Referring now particularly to Figure 2, the refrigeration system 16 of the present invention providing interstage cooling for the turbine engine includes a generator 48. The turbine exhaust gases leaving the outlet from the heat exchanger 15 are discharged to the generator 48. The generator 48 is provided with any suitable refrigerant, such as "Freon" and the like.

The heat from the exhaust gases is transferred to the refrigerant, which, in turn, produces a vapor.

Part of the vapor travels through a duct 49 to an ejector 50. The ejector 50 creates a suction on a low pressure vapor tank 51. The vapor passes from the ejector 50 through a condenser 52 wherein the vapor is liquified. A high pressure liquid tank or reservoir 53 receives the liquid refrigerant from the condenser 52. The high pressure liquid in the tank 53 is allowed to expand through a temperature operated valve 54 which leads to an evaporator 55. Heat is absorbed by the evaporator during the expansion of the liquid. The evaporator 55 is, of course, connected to the intercooling stages 30 and 31 of the turbine engine. The refrigerant is then received from the evaporator 55 by the low pressure vapor tank 51.

The level of the refrigerant in the tank 53 is controlled by a float valve 56, and excess coolant or refrigerant is returned to the generator 48 by an ejector 57 through a low pressure line 58. The ejector 57 is powered by high pressure vapor received from the generator 48 through a duct 59. Thus, a refrigeration system is provided which utilizes the hot turbine exhaust gases of the turbine engine for the intercooling stages thereof.

In Figure 4, a modified differential driving arrangement is illustrated which includes generally an electric generator 60 and an electric motor 61.

The electric generator 60 is preferably a three phase alternating current generator having for example a rotating permanent magnet type armature 60a connected to the free end of the turbine shaft 20 to be driven thereby, and a rotating field 60b connected to the output shaft 14. The stub shaft 22 of the driven compressor 13 is in turn connected to a rotating armature 61a of the electric motor 61. The motor is preferably of an induction-type and is provided with a stationary motor frame or field 61b. Current generated by the relative rotation of the armature 60a in the field 60b is picked up on a plurality of slip rings 62 and fed to the stationary field windings 61b of the motor 61 through suitable conductors 62a to thus establish a rotating field of flux in the stationary field windings 61b and drive the armature 61a and compressor 13. Thus the relative rotation of the armature 60a in the field 60b provides a magnetic flux linkage between the turbine shaft 20 and output shaft 14.

Since alternating current machinery tries to remain synchronous, the frequency of current is proportional to speed of the turbine and relative speed between the turbine and output is merely proportional to load. In other words, the speed of the compressor is proportional to frequency or proportional to turbine speed and output load.

In the operation of the present invention, incoming air is received and compressed through several stages of compression and delivered to a heat exchanger. Between the stages of compression, intercoolers are provided to reduce the amount of work performed in compression. From the heat exchanger, the high temperature, high pressure air is delivered to the combustion chamber, where the temperature is increased again. The products of combustion are delivered to a first turbine which continually drives a multi-stage compressor. The exhaust gases from the first turbine are fed to a second turbine which is differentially connected to a booster compressor through the output shaft thereby increasing or decreasing the speed of this compressor in proportion to the output.

The turbine exhaust gases from the second turbine are utilized in the heat exchanger and the refrigeration system for providing intercooling between the compressor stages.

Thus, it is seen that the instant invention provides a highly efficient gas turbine engine capable of efficiently performing over a wide range of speeds and load, and capable of utilizing the turbine exhaust gases to greatly increase the overall efficiency of the engine.

It will be understood that modifications and variations may be effected without departing from the scope of the novel concepts of the present invention, but it is understood that this application is to be limited only by the scope of the appended claims.

We claim as our invention:

1. A gas turbine apparatus comprising, a first stage compressor, a second stage compressor, a third stage compressor, and heat exchange means arranged in series, a combustion chamber receiving gas from said heat exchange means, a first turbine receiving the products of combustion from said combustion chamber and driving the second and third stage compressors, a second turbine receiving gas from the first turbine and connecting with the first stage compressor, said second turbine being further in communication with the heat exchange means, an output shaft, means for differentially connecting the second of said turbines, the first stage compressor and output shaft, and means directly connecting the first of said turbines to the second and third stage compressors, said differential connecting means comprising an electric generator between the second turbine and output shaft and an electric motor driven by the generator and connected to the first stage compressor.

2. A gas turbine apparatus comprising, a first stage compressor, a second stage compressor, a third stage compressor, and heat exchange means arranged in series, a combustion chamber receiving gas from said heat exchange means, a first turbine receiving the products of combustion from said combustion chamber and driving the second and third stage compressors, a second turbine receiving gas from the first turbine and connecting with the first stage compressor, said second turbine being further in communication with the heat exchange means, an output shaft, means for differentially connecting the second of said turbines, the first stage compressor and output shaft, and means directly connecting the first of said turbines to the second and third stage compressors, said differential connecting means comprising an electric motor having an armature connected to the first stage compressor, a generator having a rotating field connected to the output shaft and an armature connected to the second turbine, whereby power generated from said generator is supplied to the motor for driving the first stage compressor.

3. In a gas turbine apparatus including a combustion chamber, a first compressor discharging into the combustion chamber, a first turbine connected to said first compressor and forming a free spool compressor-turbine assembly, a second compressor in series with said first compressor and discharging into said first compressor, a second turbine in series with said first turbine, an output shaft connected to said second turbine, said first and second turbines being driven by the products of combustion from said combustion chamber, and means differentially connecting said output shaft to said second compressor, a refrigeration system for cooling selected zones in said turbine apparatus comprising a vapor generator adapted to contain a supply of refrigerant, means for intimately communicating turbine exhaust gases with the refrigerant in said vapor generator, a first ejector means having a zone of low pressure defined therein receiving vaporous refrigerant from said generator, a condenser receiving expanded refrigerant from said first ejector means, a low pressure vapor tank communicating with the low pressure zone in said first ejector means, a high-pressure liquid refrigerant tank receiving liquid refrigerant from said condenser, an evaporator commuunicating with said low-pressure vapor tank and said high-pressure liquid refrigerant tank and receiving pressurized liquid refrigerant therefrom, means controlling the level of liquified refrigerant in said high-pressure liquid refrigerant tank, and a second ejector means having a zone of low-pressure defined therein receiving vaporous refrigerant from said generator and returning liquified refrigerant to said vapor generator, said high-pressure liquid tank also being in selective communication with the low-pressure zone in said second ejector to return excess liquid refrigerant to said vapor generator.

4. In a gas turbine apparatus comprising a combustion chamber providing a source of driving exhaust gases, a free spool turbine receiving driving exhaust gases from said combustion chamber, a first compressor connected to said free spool turbine and discharging compressed air into said combustion chamber, said free spool turbine and said first compressor forming a free spool compressor-turbine assembly, a power turbine in series with said free spool turbine and receiving driving exhaust gases from said combustion chamber, a second compressor in series with said first compressor and discharging into said first compressor, an output shaft connected to said power turbine, and means differentially connecting said output shaft to said second compressor, a refrigeration system for interstage intercooling between the compressors and combustion chamber of said gas turbine apparatus comprising a vapor generator adapted to contain a supply of refrigerant, a first throttling means having a zone of low-pressure defined therein receiving vaporous refrigerant from said generator, a condenser receiving expanded refrigerant from said first throttling means, a low-pressure vapor tank communicating with the low-pressure zone in said first throttling means, a reservoir tank receiving liquid refrigerant from said condenser, an evaporator communicating with said low pressure vapor tank and said reservoir tank and receiving pressurized liquid refrigerant therefrom, means controlling the level of liquified refrigerant in said reservoir tank, and a second throttling means having a zone of low-pressure defined therein receiving vaporous refrigerant from said generator and said reservoir tank and returning liquified refrigerant to said vapor generator.

References Cited in the file of this patent

UNITED STATES PATENTS

| | | |
|---|---|---|
| 2,318,905 | Traupel | May 11, 1943 |
| 2,322,717 | Nettel | June 22, 1943 |
| 2,362,714 | Nettel | Nov. 14, 1944 |
| 2,408,080 | Lloyd | Sept. 24, 1946 |
| 2,497,338 | Baron | Feb. 14, 1950 |
| 2,624,172 | Houdry | Jan. 6, 1953 |
| 2,625,012 | Larrecq | Jan. 13, 1953 |
| 2,626,502 | Lagelbauer | Jan. 27, 1953 |
| 2,693,080 | Hutchinson | Nov. 2, 1954 |
| 2,807,138 | Torell | Sept. 24, 1957 |

FOREIGN PATENTS

| | | |
|---|---|---|
| 868,809 | Germany | Feb. 26, 1953 |
| 595,357 | Great Britain | Dec. 3, 1953 |